UNITED STATES PATENT OFFICE.

JULIUS KIRCHER, OF NEW YORK, N. Y.

IMPROVEMENT IN PRINTING-INKS.

Specification forming part of Letters Patent No. 132,840, dated November 5, 1872.

*To all whom it may concern:*

Be it known that I, JULIUS KIRCHER, of the city, county, and State of New York, have invented a certain new and useful Process for Making Printing-Ink suitable to be used for printing with type, lithographic plates, steel, wood, or other engravings.

The nature of my invention consists in mixing coal-tar with coal-oil or vegetable or animal oil, turpentine, or wax, and black oxide of manganese, lamp-black, or some similar coloring substance.

The coal-tar is, in the first place, to be freed from such foreign substances as will produce a disagreeable smell and will produce a brown hue. For this purpose take one hundred parts of coal-tar and add to it from one to five parts of caustic soda which has been dissolved in ten parts of water; then heat this product either over an open flame or subject it to a steam-bath; or steam may be conducted through it in such a manner as to thoroughly permeate the mass for a sufficient time until the mass becomes of the consistency of printing-ink. This may be done either with or without pressure. A pressure equal to five atmospheres operating on the mass from four to five hours I find produces the quickest results. After this the water is drawn off and the product thoroughly washed.

Having prepared the coal-tar as above, I mix one hundred parts, by weight, of the coal-tar with from two to thirty parts, by weight, of the coloring matter, using black oxide of manganese, aniline-black, or lamp-black, and adding from four to twenty parts, by weight, of coal-oil, or vegetable or animal oil, or turpentine, or wax, or their equivalents —or, for cheapness, fat, lard, tallow, or butter —using the larger quantities of these coloring substances for the fine inks.

I find that the proportion of eighty-four parts of coal-tar, ten parts of black oxide of manganese or lamp-black, and six parts of coal-oil makes an excellent ink for common printing.

A proportion for fine ink is seventy parts coal-tar, twenty parts of lamp-black, and ten parts of coal-oil.

The extreme limits are those within which the inks may be made; though I have found the above proportions to produce the best results.

Claims.

What I claim, and desire Letters Patent for, is—

1. In the manufacture of printing-inks, treating the coal-tar with a liquid solution of caustic soda and water for the purpose specified, the whole being subjected to heat in the manner set forth.

2. Coal-tar treated with a liquid caustic soda and heat and combined with coal-oil, lamp-black, and coloring matter in the manner and about in the proportions herein specified, forming a compound for printing-ink, as set forth.

3. A printing-ink made in the manner herein set forth, and of the ingredients and in the proportions herein described.

JULIUS KIRCHER.

Witnesses:
LOUIS S. THOMAS,
E. W. TYLER.